Patented Dec. 26, 1922.

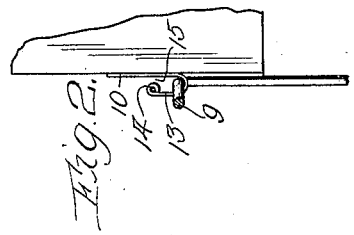
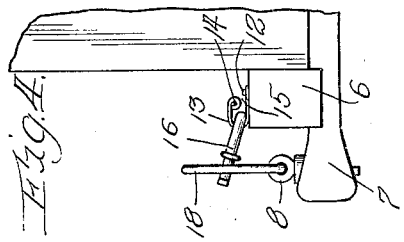
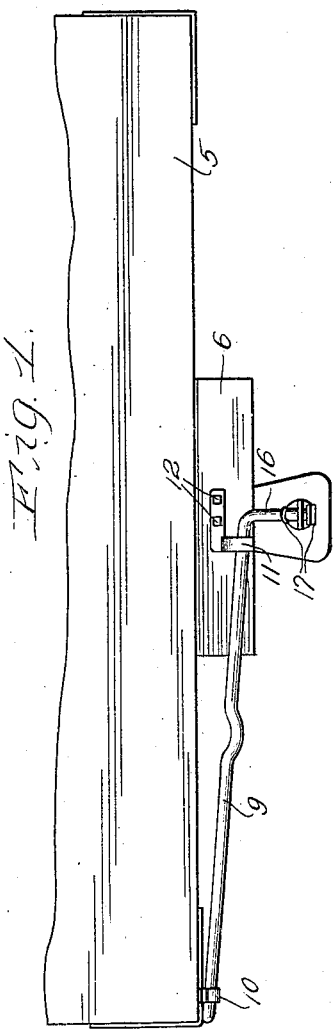
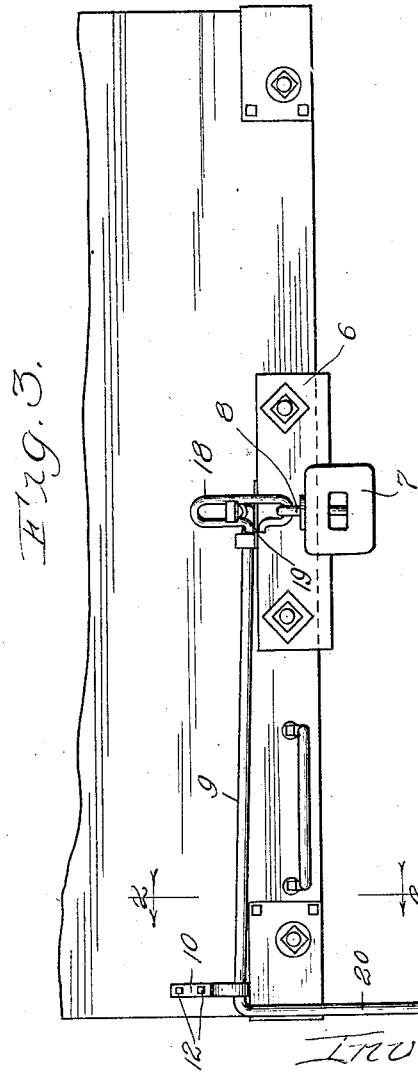

1,439,888

UNITED STATES PATENT OFFICE.

RUBY R. HAWK, OF CHICAGO, ILLINOIS.

CAR UNCOUPLING.

Application filed October 16, 1919. Serial No. 321,135.

*To all whom it may concern:*

Be it known that I, RUBY R. HAWK, a citizen of the United States, residing at Chicago, in the county of Cook and State of Illinois, have invented certain new and useful Improvements in Car Uncouplings, of which the following is a specification.

My invention relates to car uncoupling devices and has for one of its objects the provision of simple and efficient means which can be easily and quickly adjusted into and out of operative position on a car.

A further object is the provision of members of resilient material with openings therein permitting engaging parts to snap into and out of such resilient members in order to make the device easily and quickly taken apart and put together.

Other objects will appear hereinafter.

An embodiment of my invention is illustrated in the accompanying drawing, forming a part of this specification, and in which—

Fig. 1 is a plan view of an end portion of a freight car, or the like, equipped with a train uncoupling device embodying my invention;

Fig. 2 is a fragmental side elevation of a car end showing the car uncoupling device in section;

Fig. 3 is a fragmental end view of a car equipped with my invention; and

Fig. 4 is a side view of the same.

In the drawing I have indicated more or less diagrammatically a fragment of a car end 5 which may represent any common or preferred car construction. Such car ends usually have a block 6 fitted thereto and a drawbar head 7 attached to the block and car end. In the drawbar head is a coupling pin 8 adapted to engage a coupling link, not shown, for coupling cars.

In my improvement I provide a shaft 9 which I mount in bearings 10 and 11. Each of the bearings 10 and 11 is preferably formed of a resilient material, such as sheet spring steel, and secured to the car end by lag screws 12, or any other desirable means. Each of the bearings 10 and 11 is provided with a substantially U-shaped portion 13 with a bent end portion 14 on one of the legs of the U-shaped part. The opening 15 between the bent portion 14 and the inner leg of the bearing is preferably considerably narrower than the thickness of shaft 9, so that in order to place the shaft into or remove it from the bearings, the U-shaped part 13 must flex so as to permit the shaft to pass out through opening 15. This provides for easily and quickly moving the shaft into and out of said bearings.

One end of shaft 9 is provided with an arm 16 which extends outwardly and upwardly from the car end and has attached thereto members 17 spaced apart. The members 17 may be formed integrally with the arm 16, or in any other desirable manner. A link 18 is slidably mounted on the arm 16 between members 17 and has its lower end connected with the coupling pin 8. The link 18 is also preferably formed of resilient material and provided with an opening 19 in one side, preferably nearer the bottom of the link. The opening 19 is preferably narrower than the width of arm 16 between the members 17 so that in order to connect the link, both in the coupling pin 8 and on arm 16, the link 18 must flex so as to increase the width of opening 19.

On the outer end of shaft 9 I provide an arm 20 which is adapted to be engaged by the hand of an operator for rotating the shaft 9 for operating the device. The arms 16 and 20 are preferably disposed in a manner so that when the device is at rest arm 20 will lie substantially against the end of the car, see Fig. 2, and hold the arm 16 somewhat inclined, see Fig. 4. This holds the arm 16 normally at a height slightly above opening 19 in link 18 and thereby prevents the link 18 from being accidentally disengaged from arm 16 by an article falling or other force being applied to the link 18 when opening 19 would be opposite arm 16.

To disconnect shaft 9 it is raised out of bearing 10 and removed laterally out of bearing 11, then arm 16 is lowered until the latter is even with opening 19 when the link 18 can be snapped off of arm 16. The link 18 then can be turned around on pin 8 until opening 19 is opposite the eye of pin 8 when the link can be easily sprung from or snapped off of said pin. In putting the parts together the reversal of this order is followed.

The openings 15 of bearings 10 and 11 are arranged so that the thrust on shaft 9 will be away from said openings. The arm 20 is swung away from the car end to which the device is attached to uncouple the car. This causes the thrust of shaft 9 in bearing 10 to bear against the lateral sides of the latter. The weight of the arm and shaft holds the latter against the bottom of said bearing. The thrust of the shaft in bearing 11 is substantially vertical against the sides of said bearing. The pin 8 is at the closed side of bearing 11, hence the thrust on said shaft in raising the pin 8 will cause the shaft to bear against the bottom or side opposite the open side of said bearing. It will also be seen that the thrust on the shaft will tend to hold such shaft adjacent the sides of the bearings opposite the openings therein and therefore tend to prevent removal of the shaft from said bearing.

I claim:—

A car uncoupler comprising a shaft; bearings engaging said shaft; an arm on the shaft; spaced members on the arm thicker than said arm; and a coupling pin link engaging the arm between said members, said link being of resilient material with an opening therein narrower than the thickness of said arm and adapted to spring over the latter.

In testimony whereof I have signed my name to this specification on this 13th day of October, A. D. 1919.

RUBY R. HAWK.